July 8, 1952  O. MOEN  2,602,339
DRIVING MEANS FOR DYNAMOHUBS
Filed June 26, 1950
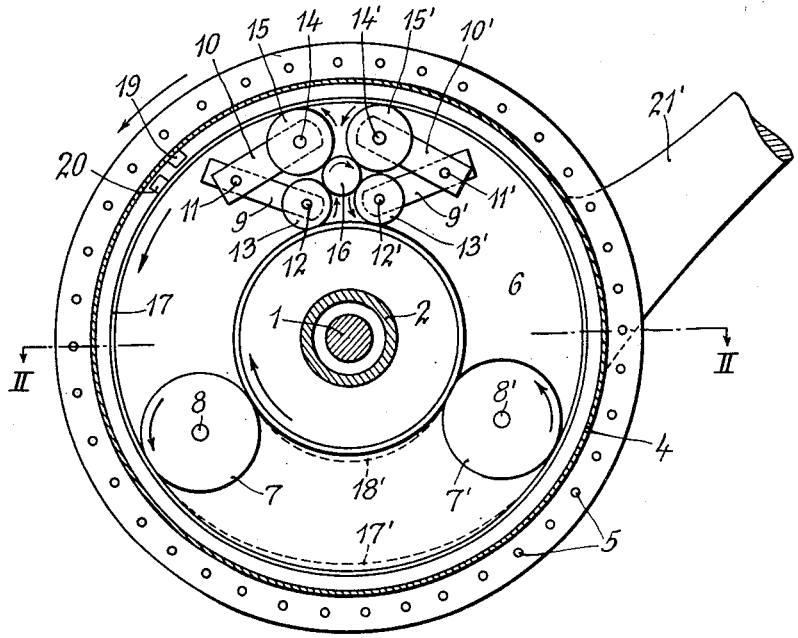
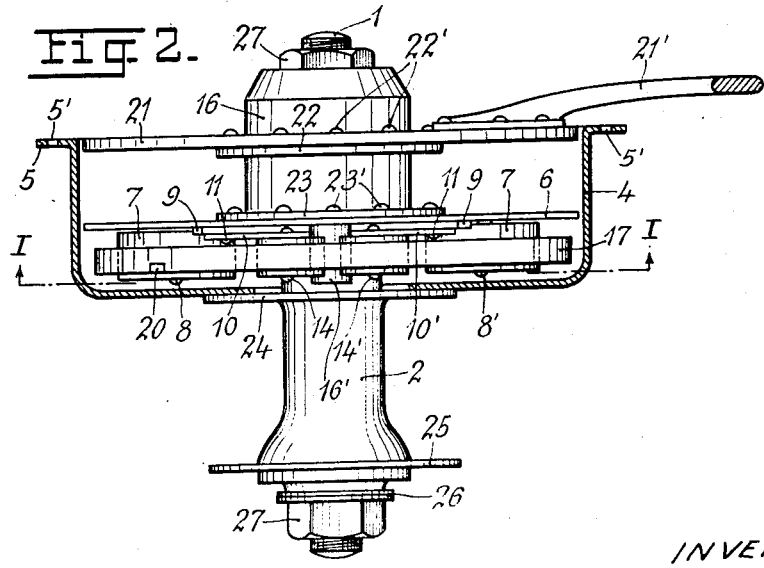
INVENTOR
OTTO MOEN
BY Robert H. Jacob
HIS AGENT Patented July 8, 1952

2,602,339

UNITED STATES PATENT OFFICE 2,602,339

DRIVING MEANS FOR DYNAMO HUBS

Otto Moen, Riisveien, Vinderen, Oslo, Norway

Application June 26, 1950, Serial No. 170,274
In Norway August 21, 1948

8 Claims. (Cl. 74—206)

The present invention relates to a driving means for so-called dynamo-hubs, that is bicycle hubs with a built-in dynamo or lighting-set, and the object of the invention is to improve such driving means.

Various constructions of such dynamo-hubs are known, which are based upon transmission of the driving force by means of pinions or by means of friction wheels, or a combination of both. Transmission by pinions is very reliable but demands very great precision in manufacturing, particularly if stress is laid on running as noiselessly as possible, which involves a considerable increase in the cost of manufacture.

Transmission by friction as hitherto used has employed one or more pulleys of a material of a high friction coefficient rolling against a member which is rotating with the wheel, e. g. the hub-drum or the like, the material of high friction coefficient being principally natural or synthetic rubber. Obviously, this is subject to wear and tear, and an additional disadvantage of natural rubber is that it is injured by lubricants.

An object of the present invention is to overcome these disadvantages, and to this end, the invention consists in a driving means for a dynamo arranged within a bicycle hub, wherein the dynamo is mounted on a plate connected with the fork of the wheel and/or the hub spindle and is driven from the hub casing which is built wholly or partly as a drum, and wherein a ring of metal is rotatably supported concentrically in the hub casing on rollers, at least one of which has a driving connection with the dynamo shaft.

By means of the invention, simplicity in manufacture of a transmission by friction is obtained, combined with the reliability in operation of a transmission by pinions, without involving such great precision work as is required by a pinion transmission.

A more reliable driving means is obtained when the concentrically arranged metal ring is duplicated, one of which rings having its inner peripheral surface running on the rollers, and the other of which having its outer peripheral surface running on the rollers, of which rollers at least one being common to both rings.

The invention will be better understood when reading the following description of an embodiment shown in the accompanying drawing, in which:

Fig. 1 shows a radial section of a bicycle hub taken on the line I—I in Fig. 2, and Fig. 2 a partly axial section of the same hub taken on the line II—II in Fig. 1.

Referring to the drawing, the fixed hub spindle 1 is clamped to the end of the wheel fork (not shown) by means of nuts 27 with washers 26. The hub casing 2 has a drum-shaped extension or portion 4, and these are provided respectively with annular flanges 25 and 5 having holes for the spokes, these holes extending through the flanges parallel to the hub axis. The holes of the flanges 5 only are shown at 5'. The hub casing 2 encloses the spindle 1 with a comparatively small clearance and at about its middle is provided with an annular flange 24 to which the drum 4 is secured, e. g., by spot welding.

The open end of the drum 4 is covered by a cover plate 21 prevented from rotating by means of an attached arm 21' which is fixed to the fork and/or the hub spindle.

The construction thus far described is exactly the same as with the ordinary hub brakes, wherein the brake blocks and their operating means are mounted inside the drum on the cover plate 21.

Inside the drum and parallel with the plate 21 is arranged a similar plate 6 rigidly connected with plate 21 and carrying the driving means for the hub dynamo 16. This hub dynamo is, in the present case, mechanically fixed to both plates 21 and 6 and thereby serves as a part of the rigid connection between the two plates. In the embodiment, the dynamo is provided with two annular flanges 22 and 23 secured to the plates 21 and 6 by means of screws or rivets 22' and 23' respectively. The free end 16' of the dynamo shaft is introduced through a bore in the plate 6 so as to extend into the chamber formed between the inner end wall of the drum 4 and the plate 6, within which chamber also the remaining part of the driving mechanism is located.

In the present embodiment, it is assumed that the drum 4 is intended to contain not only the driving means for the dynamo, but also the necessary parts for a hub brake, and for this purpose a further chamber in the drum is provided between the plates 6 and 21.

As will appear clearly from Fig. 1, a number of rollers are journalled to the inner side of the plate 6, and around them is placed a ring 17 made of metal and possessing a certain elasticity. Preferably, this ring is produced from spring steel or the like. The shaft 16' protruding through the plate 6 is in contact with a pair of rollers 15, 15'. The ring 17 is located outside the rollers 15 and 15' as well as the support rollers 7 and 7', and is pulled around by the drum 4 during the movement of the bicycle, by means of a projecting member 19 secured to the drum and engaging a projection catch of nose 20 on the ring 17. By a displacement parallel to the axis, the member 19 may be brought into and out of engagement with member 20. When the ring 17 is entrained with the drum, its movement will be transferred to all the rollers 7, 7' and 15, 15'. The latter pair transfer the rotating movement to the dynamo shaft 16'.

In order to increase the reliability of the transmission, an inner ring 18 is arranged concentrically within the ring 17, so the outer periphery of the ring 18 runs between and in contact with the rollers 7, 7' and 13, 13'. The latter pair 13 and 13', in a similar way as the rollers 15 and 15', are in contact with the dynamo shaft 16', so that the latter is surrounded by four rollers all of which are driven by the ring 17, the inner ring 18 obtaining its drive from ring 17 through the rollers 7 and 7'. The rollers 7 and 7' rotate on pins 8 and 8' respectively fixed to the plate 6.

In order to obtain the best possible contact and at the same time eliminate the effect of wear and tear and lack of precision of manufacturing, the ring 17 may have a somewhat smaller diameter than indicated, so that it will become slightly deformed when placed around the rollers, as illustrated at 17' for the portion of the ring which is between the rollers 7 and 7'. In a similar way, the ring 18 may have a somewhat larger diameter than indicated, so that it will bulge out between the rollers, as illustrated at 18' for the portion of the ring between the rollers 17 and 17'. The arrows in Fig. 1 show the relative directions of rotation. As will appear, no wear and tear by rubbing will arise because the peripheral velocity of all the rotating members is the same.

In order to obtain a reliable transmission of the movement to the dynamo shaft 16', the four rollers 13, 13', 15 and 15' are mounted in such a way that they are allowed to move in a direction perpendicular to their axis of rotation. In the present case, this is obtained by mounting these rollers on one end of arm 9, 9', 10 and 10' respectively, the other ends of which arms are journalled to the plate 6 by means of pins 11 and 11' respectively. Of the two pairs of rollers 13, 13' and 15, 15', one roller of each pair is consequently oscillatingly mounted on a common pin 11 and 11' respectively.

It is within the scope of the invention to utilise one driving ring only, and it is of no consequence whether that driving ring is the inner one 18 or the outer one 17. It is also evident that one or both rings may drive directly upon the dynamo shaft 16' which should, in this case, be provided with a roller of substantially the same diameter as the rollers 7 and 7'. However, in that case also, the speed of the dynamo shaft would be less, which would necessitate a larger dynamo. For this reason the embodiment shown is regarded as the most suitable one for the purpose.

I claim:

1. Driving means for a bicycle hub dynamo including in combination a stationary hub shaft, a bicycle hub mounted for rotation around said shaft, a plate having rigid connection with said shaft, said hub having rigidly connected therewith a rotary annular extension around said plate, a driving ring in said extension and concentrically around said hub, rollers mounted on said plate for rotary movement and supporting said ring, driving connections between said ring and said hub and having engaged and disengaged relations, a dynamo shaft supported for rotation in said extension and having driving engagement with said rollers, said ring being of elastically deformable material, and the supports for said rollers being capable of movement perpendicularly to their axes of rotation.

2. A construction in accordance with claim 1, in which there are four of said rollers supporting said ring, two of said rollers having driving engagement with said dynamo shaft and also being capable of movement perpendicular to their axes and the other two of said rollers being capable only of movement that is rotary around their axes, said four rollers having engagement with one of the inner and outer cylindrical surfaces of said ring.

3. A construction in accordance with claim 2 in which said four rollers engage the outer cylindrical surface of said ring.

4. A construction in accordance with claim 2 in which said ring comprises a first ring and said four rollers comprise a first group of rollers, a second driving ring of elastically deformable material concentric with said first ring, and a second group of four rollers mounted on said plate for rotary movement and supporting said second ring, two rollers of said second group having driving engagement with said dynamo shaft and being capable of movement perpendicular to their axes of rotation and the other two rollers of said second group being capable only of movement that is rotary around their axes, the rollers of said first group engaging the inner cylindrical surface of said first ring, and the rollers of said second group engaging the outer surface of said second ring.

5. A construction in accordance with claim 4 in which at least one of said rollers is common to said two groups of rollers.

6. A construction in accordance with claim 4 in which two of the rollers of each of said groups adjacent and engaging said dynamo shaft are closely spaced and near each other with relation to the diameter of said shaft, whereby the rotary movement of said hub and its said extension is effectively transmitted through said rings and through said closely spaced rollers to said dynamo shaft.

7. A construction in accordance with claim 4 in which the rollers having driving engagement with said dynamo shaft have movable bearing supports, oscillatory arms secured to said bearing supports and extending in opposite directions away from said dynamo shaft, said arms at their ends remote from said dynamo shaft having pivotal connection with said plate.

8. A construction in accordance with claim 7 in which said oscillatory arms are in pairs respectively crossing each other and the pivotal connections for each of said pairs of arms with said plate, being a common connection for the corresponding pair of arms.

OTTO MOEN.

REFERENCES CITED

The following references are of record in the file of this patent:

FOREIGN PATENTS

| Number | Country | Date |
|--------|---------|------|
| 38,597 | Sweden | Apr. 23, 1913 |